Nov. 10, 1959  A. CERVI ET AL  2,912,591
RADIATION PROTECTION DEVICE
Filed Aug. 31, 1955  2 Sheets-Sheet 1
FIG. 1
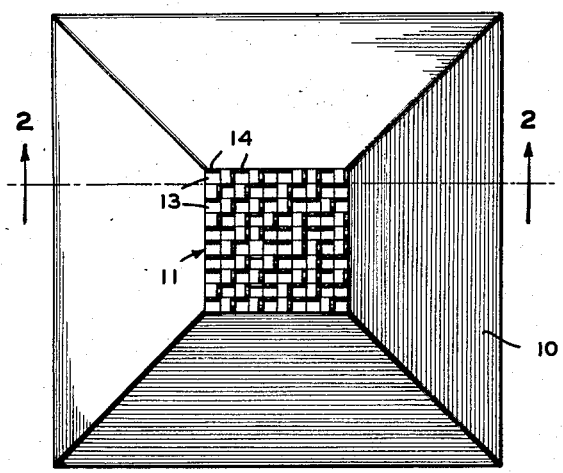
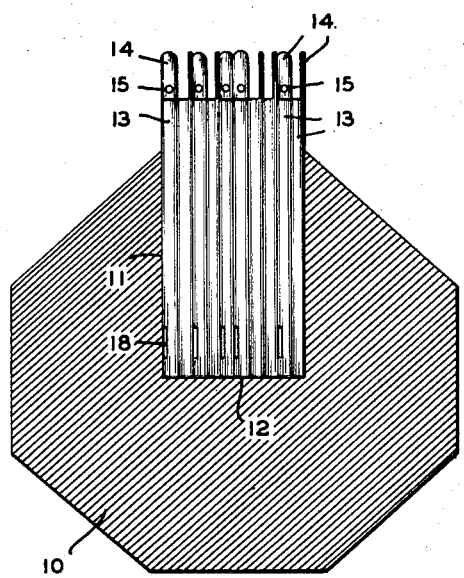
FIG. 2
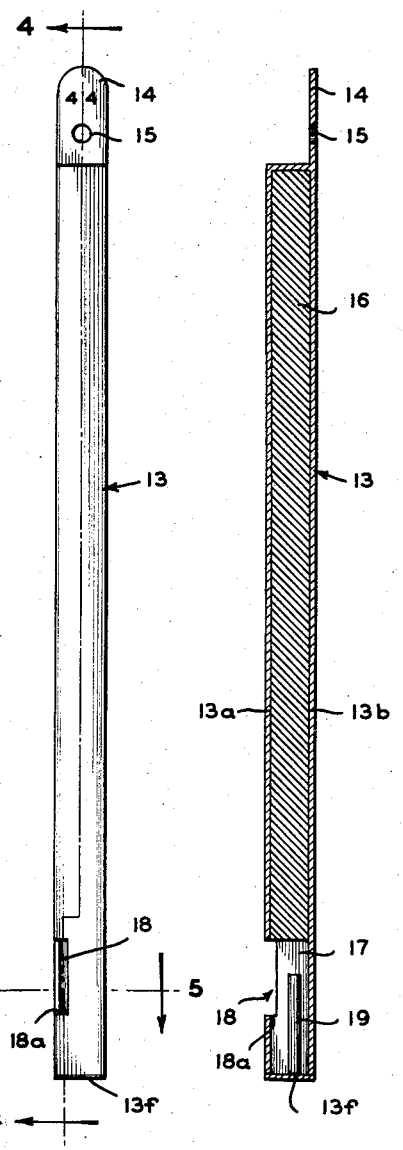
FIG. 3  FIG. 4
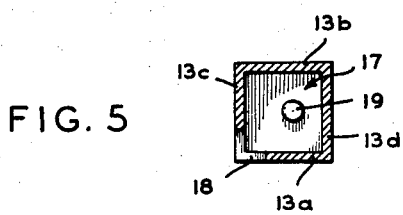
FIG. 5
INVENTORS,
ARMANDO CERVI
MARCUS E. WALTER
BY
ATTORNEY Nov. 10, 1959 A. CERVI ET AL 2,912,591
RADIATION PROTECTION DEVICE
Filed Aug. 31, 1955 2 Sheets-Sheet 2

INVENTORS
ARMANDO CERVI
MARCUS E. WALTER

BY

ATTORNEY

United States Patent Office 2,912,591
Patented Nov. 10, 1959

2,912,591

RADIATION PROTECTION DEVICE

Armando Cervi and Marcus E. Walter, New York, N.Y., assignors to The Radium Emanation Corporation, New York, N.Y., a corporation of Delaware Application August 31, 1955, Serial No. 531,761

18 Claims. (Cl. 250—106)

The present invention relates to improvements in radiation safety devices for handling and storing radiation sources, both natural and artificial, and especially those sources which are emitters of gamma rays.

It has been the practice heretofore to store individual radiation sources in lead blocks provided with drawers, also of lead, in which holes are drilled to dimensions to accommodate the individual radiation sources. The primary disadvantage of this method is that when a drawer is drawn out to make available one source, the operator is exposed to the radiation emitted from all the other sources in the drawer. A further disadvantage is that the method consumes too much time. Each individual drilled hole must be numbered to identify the source it contains and the individual source must also be correspondingly marked. The process of identification, removal of the source and replacement must be very exact and is time consuming; and during the entire time of these operations the technician is exposed to the radiation emitted by all the tubes in the drawer, and, to a lesser extent, to the radiation emitted by the sources in other drawers, since the filtration of the drawer that is drawn has been removed partially or completely.

In accordance with the present invention, there is provided a radiation absorbing mass having a top portion, said mass surrounding a plurality of relatively elongated means for shielding and storing a radiation source, each of said means extending above the top of said radiation absorbing mass and means are provided at one end thereof for the radiation source storage compartment there being a protective radiation absorbing material extending above said storage compartment, the latter being provided with means for discharging a source of radiation therefrom.

The elongated means for shielding and storing a radiation source may illustratively be in the form of tubes, rods or holders. Preferably, the upper portion of the elongated means for shielding and storing a radiation source is provided with removal means which may be in the form of a tab.

In one form of the present invention there is provided a radiation source storage device comprising a rod, tube or holder, the major portion of said tube being filled with protective radiation absorbing material, as for example, lead, and the minor portion of said tube being hollow. Closure means are provided at the lower end of the tube. The wall of the hollow portion of the tube or rod is provided with a storage compartment positioned adjacent the lower end of the protective radiation absorbing filling material.

The means for discharging a source of radiation from the tube or holder may take the form of a slot and when the tube or holder is provided with sides, the discharging slot preferably extends across the juncture of two of the longitudinally extending sides of the holder, tube or rod. While, in the drawing, the holder or tube is shown as of rectangular formation, it is recognized that the tube or holder may have various forms, either being round, oval shaped, rectangular, triangular or the like.

In one form of the invention the storage device comprises a mass of radiation absorbing material formed with a recess therein, a plurality of relatively elongated holders for shielding and storing a radiation source, said holders being fitted within said recess and substantially filling the same, the upper portion of each of said holders protruding above the mass of protective radiation absorbing material, the lower portion of each of said holders having a storage compartment for the reception of a radiation source, said storage compartment being provided with means for discharging the source of radiation therefrom.

The storage compartment is constructed to facilitate insertion and removal of a radiation source into and from the storage compartment to further reduce the amount of radiation to which the technician is exposed during the time that the radiation source is being either removed from storage for use, or removed from use and returned to storage.

An object of the invention is the provision of a radiation protection and radiation source storage device for reception of a plurality of radiation sources in which the sources may be safely stored and quickly and easily removed from storage and returned to storage without unduly subjecting the operator to radiation.

A further object of the invention is the provision of a radiation protection and radiation source storage device in which each individual source can be identified without subjecting the operator making the identification to any substantial danger of exposure to radiation.

Another object of the invention is the provision of a radiation protection and radiation source storage device in which a plurality of individual sources can be stored and in which the removal of one of the sources does not expose the operator to radiation from the remainder of said sources.

Another object of the invention is the provision of a radiation source storage device adapted for the handling of an individual radiation source in which the storage device is constructed to facilitate the rapid insertion and removal of radiation sources in tube or similar form.

Other and further objects of the invention will become apparent from the description which follows taken in conjunction with the accompanying drawings in which:

Fig. 1 is a plan view of a radiation protection and radiation source storage device adapted for the storage of a plurality of individual radiation sources;

Fig. 2 is a cross section taken on the line 2—2 of Fig. 1;

Fig. 3 is a side elevation of a device in accordance with the invention adapted to receive a separate radiation source in tubular form;

Fig. 4 is an elevation in section of the device shown in Fig. 3;

Fig. 5 is a cross sectional view taken on the line 5—5 of Fig. 3;

Figure 6:
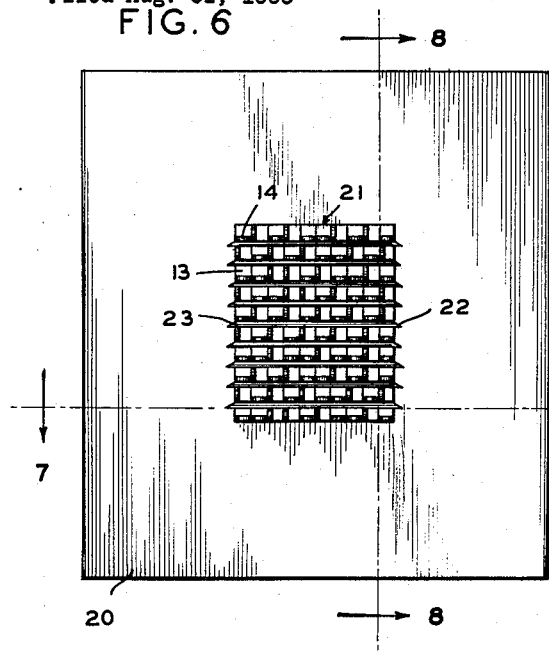
Fig. 6 is an end elevation of a modified form of radiation protection and radiation source storage device adapted for the storage of a plurality of individual radiation sources disposed in horizontal position.
Figure 8:
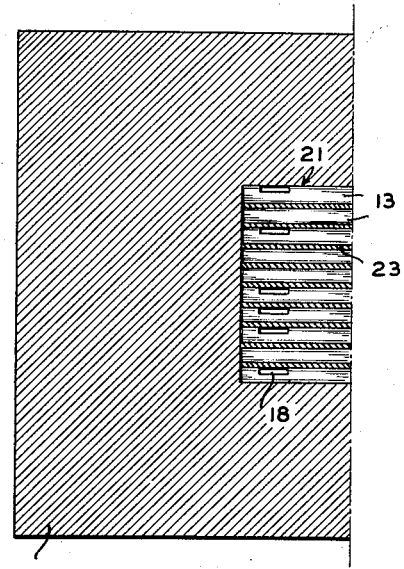
Fig. 8 is a fragmentary vertical sectional view taken on line 8—8 of Fig. 6.

The radiation absorbing power of matter depends upon the type of radiation and the density of the absorbing matter. The type of radiation may vary from the very heavy, easily absorbable alpha particles, to the very short wave length deeply penetrating and difficult to absorb gamma rays. Usually, gamma radiation is expressed in terms of its energy or mev.; and the absorption of matter for a particular type of radiation is expressed in terms of the half-value layer, that is, that thickness of material that will reduce the radiation intensity of an incident beam to one-half. An additional half-value layer will reduce the remaining radiation intensity to one-half, or one-quarter of the original. This, of course, presupposes a parallel beam. The absorption is, therefore, an exponential function of the thickness of the absorbing medium.

The law of absorption for a definite type of radiation by an absorbing medium is as follows:

$$I = I_0 e^u t$$

Where:

$I_0$ = Original intensity of incident beam
$I$ = Intensity of radiation after passing through thickness $t$ of absorbing medium
$t$ = thickness of absorbing medium
$e$ = Naperian number
$u$ = Coefficient of absorption of the absorbing medium for that particular type of radiation of incident beam The intensity of radiation at any given point in space due to radiation from a point source is inversely proportional to the square of the distance from the given point to the point source.

Radiation protection, therefore, depends upon three factors, i.e., one, distance from the source of radiation; two, protective absorbing matter; and three, time of exposure. These three factors must be made to work so that the technician will be exposed to minimum radiation. Means must be provided to allow for distance when a source is removed from protective shielding; means must be provided to allow for protective shielding in every direction to reduce the intensity of radiation to a safe level; and most important, means must be provided to permit the easy and quick availability of individual sources in minimum time. Specifically, in a device for storing radiation sources, the optimum condition is that in which the technician can select the individual source he desires without exposing himself to the radiation from the other sources therein stored, and where he can remove or replace the source without disturbing the safe position of the other sources; and where the intensity of radiation at the surface of the storage unit remains at a uniform safe level during the entire set of operations described. This means that while a source is being removed or replaced, the intensity of radiation at any point due to radiation from the other sources will remain the same. This optimum condition is attained by the present invention.

The protective absorbing medium most commonly employed is lead because of its high density, 11.0, and its low price. Excellent absorbers are platinum and gold; but even though their densities are very high, 21.5 and 19.3 respectively, they are not used as protective absorbing media because of their high price.

While the principles employed in accordance with the invention are applicable to the handling and storage of all types of radiation sources and the use of any absorbing material, the storage and handling of radium using lead as the absorbing media will be described in order to illustrate the invention.

The mev. of gamma rays of radium is 1.8; and the half-value layer for this type of gamma radiation is one-half inch of lead. A point source of radium element in equilibrium with its products of radioactive distintegration, filtered by one-half millimeter of platinum emits radiation in every direction such that at a point one centimeter from the source, the intensity of radiation is 8.4 gamma roentgens per hour, or 8,400 milliroentgens per hour (mr.h.). At a distance of 10 centimeters from the source the intensity is 84 mr.h. If a thickness of one-half inch of lead is placed between the source and the point 10 centimeters from the source, the intensity of radiation is cut in half to 42 mr.h. An additional layer of one-half inch of lead will reduce the intensity to 21 mr.h. An additional layer of one inch of lead, representing two half-value layers, will reduce the intensity to 5.25 mr.h. The reduction of intensity is most important when it is considered that a technician must not be exposed to radiation higher than the allowable safe maximum of 300 mr. per work week.

The radium source to be considered as well as sources of radon, cobalt 60, caesium 134 and other gamma ray emitters are usually not longer than one inch and of a diameter not more than 3 millimeters. Accordingly, the invention will be illustrated in conjunction with sources having the foregoing dimensions. It will be appreciated, however, that the dimensions of the individual parts to be described can be changed in accordance with the laws of absorption to accommodate sources of other types and dimensions without departing from the scope of the invention.

Referring to Fig. 1, the numeral 10 indicates a block which can be cast of lead or constructed with a plurality of lead sheets, the block 10 being formed with a recess 11 which is preferably rectangular in cross section and in the form illustrated is square in cross section. The bottom 12 of the recess 11 is preferably positioned so that this bottom 12 corresponds to the center of the block 10. A plurality of rods 13 preferably of square cross section are fitted within the recess in side by side fashion so as to entirely fill the recess 11. The rod 13 is provided with longitudinally extending sides 13a, 13b, 13c and 13d.

While a rectangular shaped rod is desirable, it is recognized that the rods may have different shapes, it only being desirable in one form of the invention that the rods be nested to entirely substantially fill the space within the recess 11. If one row of rods is circular in cross section, then the adjacent row of rods would have a curvature where they touch the first row of rods complementary to the curvature of said first row of rods so that the complementary surfaces of the rows of rods when assembled mate and there is substantially no space between the rods. Alternatively, if circular rods are used, the solid block of radiation absorbing material, as for example lead, may be drilled to form contiguous holes in each of which a rod fits slidably.

The ideal condition is for the rods to fill the space within the recess 11 to thereby reduce radiation. If the rods fit loosely, there is some radiation leakage and this, whenever possible, should be reduced to a minimum even, if in some cases, it could not be entirely eliminated.

It will be appreciated that the space provided by the recess 11 in the block 10 is determined by the number of rods which it is desired to store and it is also desirable to provide space for a few extra rods. Thus, if 90 rods are needed, the recess 11 is dimensioned to receive 100 rods, e.g. the recess 11 is dimensioned so that each of the lineal sides will snugly receive 10 rods.

Each individual rod 13 is produced from a metal tube which preferably, although not necessarily, is rectangular in cross section and desirably square in cross section. Any suitable metal or alloy may be used, and even a plastic rod may be used subject to the limitation that it is relatively inert to destruction by ray emission and especially gamma ray emission. Brass tubing may be desirably used.

Each rod 13 may be provided with removal means on the upper exposed portion thereof, said means preferably carrying indicia identifying the source material, as for example, gamma ray source material, said means being visible to the operating technician when the plurality of rods are assembled within the recess 11. One preferred structure is to provide the top of the rod 13 with a longitudinally extending tab 14 preferably fixedly mounted thereon, said tab being desirably formed integral with the rod 13. The removal means are preferably provided with an aperture 15 to facilitate handling, said aperture being desirably formed by drilling the tube member.

The rod 13 is desirably made from brass tubing and provided with a gamma ray protective mass or shield which may be constituted by any material which will function to shield the operating technician from the harmful effect of gamma rays. Usually, although not necessarily, this protective shield is constituted by lead 16 which extends from the lower extremity of the tab 14 to the upper end of storage compartment 17, the lower portion of the lead filling 16 constituting the upper wall of said storage compartment. Assuming that the lead protection is 6" long, the lead mass or shield which completely fills the tube, terminates about 1" from the bottom of the tube, said storage compartment, therefore, being about 1" long. These dimensions are not set forth by way of limitation but are merely illustrative.

The bottom of the tube from which the rod 13 is formed is closed to provide in the lower portion of the rod 13 a storage compartment 17, the latter being provided with means for receiving a gamma ray source, as for example, a radium or radon tube 19 or equivalent gamma ray source including cobalt 60 source or caesium 134 source.

In one form of the invention the receiving means comprises a slot or window 18 preferably cut across the juncture of longitudinally extending adjacent side walls 13a and 13d, said slot being preferably positioned so that the top of the slot coincides with the top of the storage compartment 17.

The width of the slot 18 is made greater than the diameter of the radium tube or capsule 19 containing, as for example, a gamma ray source so that the tube 19 can be slid longitudinally into the slot 18. The length of the slot 18 is slightly less than the length of the tube 19 holding the radiation source and, as can be seen in Figs. 3 and 4, the bottom of the slot 18 is spaced from the closed lower end 13f of the compartment 17.

The tube 19 containing the radiation source is inserted into the compartment 17 through the aperture 18 by merely placing it end first into the compartment 17 and allowing the tube 19 to fall into the compartment 17 where it abuts the interior face of end 13f of said tube 19, the latter assuming the position shown in Fig. 4. The bottom 18a of the slot 18 is preferably spaced from the closed lower end 13f of the compartment 17 a distance greater than one-half the length of the tube 19 to be stored to further insure against the tube 19 accidentally falling out of the compartment 17 while the rod 13 is being handled.

Referring to Fig. 1, the recess 11 in the block 10 is filled with rods 13 and, as can be seen from Fig. 2, the tubes 19 are positioned at the bottom of each of the rods 13 so that the sources of radiation are completely surrounded by the required protective lead or equivalent shielding. This lead shielding is provided on the sides and bottom by the lead block 10 and on the top by the lead fillings which comprise the major portion of the upper section of each of the rods 13.

Each individual gamma ray source or tube 19 is identified by a number, mark or other identifying indicia. This same number or mark is desirably affixed to the tab 14 of each rod 13 so that the particular gamma ray source 19 in the compartment 17 of each rod 13 can be identified by viewing the identifying number or mark affixed to the tab 14. When a gamma ray source 19 is in the compartment 17, it is desirable that the tab 14 be positioned so that the identifying number or mark thereon faces the front of the device. Thus, when a particular radiation source 19 is required, it is only necessary to select the rod having the required identification imbedded on its tab 14 and to remove that particular rod 13. In Fig. 4 the identifying number "44" is carried by the tab 14 to identify the radiation source.

This removal operation does not, in any manner, disturb any of the radiation source 19 present in each storage compartment 17 of each rod 13 and, therefore, does not alter the amount of protective shielding.

In order to discharge the radiation source 19 from the compartment 17 of any rod 13, the latter is placed horizontally on the edge or corner in which the aperture 18 is cut with the tab 14 facing the operating technician. The rod 13 is then tilted downwardly toward the operating technician whereupon the radiation source 19 slides out of the slot 18 without the necessity of the operating technician touching the radiation source. The rod 13 is immediately replaced in its corresponding position in the recess 11 but with the face of the tab carrying the identifying indicia in a direction at right angles to the position which the rods 13 assume as shown in Fig. 2.

By this simple procedure, it is only necessary to look at the device shown in Figs. 1 and 2 to ascertain what radiation sources are out of the device and what radiation sources are in storage in the device.

The present invention will be further specifically illustrated by the following wherein the device is of a capacity suitable for the storage of tubes having as a source of radiation a total of 500 millicuries of radium or radon. In practice, the highest radium or radon content of each individual source of radiation is less than 25 millicuries. In this particular example illustrating the invention, the dimension of each rod 13 is ⅜" by ⅜" square cross section and 7¾" in overall length, the tab 14 extending ¾" above the top of the rod 13. Since the compartment 17 is 1" in length, the rod 13 has a protective shield above the top of the compartment 17 of 6" of lead.

Assuming a maximum content of 25 millicuries for each individual source of radiation, as for example, the tube 19 which may contain radon with a suitable platinum filter, the protection provided by the individual holder or rod is a minimum of 6" of distance from the individual radiation source 19. The intensity of the gamma radiation from the individual radiation source 19 will be reduced by distance alone to 934 mr.h. (milliroentgen per hour). A protecting shield in the amount of 6" of lead provides 12 half-value layers, so that the intensity at the tab 14 of rod 13 due to the radiation from its individual source of 25 millicuries is reduced by a factor of 4096, or to an actual intensity of 0.25 mr.h.

The above figures are obtained as follows: one millicurie at one centimeter distance gives an intensity of radiation of 8.4 r.h. or 8400 mr.h. 25 millicuries at a distance of one centimeter would give an intensity of radiation of 8400 times 25 or 210,000 mr.h. At a distance of 6 inches, or 15 centimeters, the intensity is reduced by the square of 15 or to 1/225 of 210,000 which is 934 mr.h. A protective shield of 6 inches of lead is provided in each individual rod. Every half inch reduces the intensity by one-half so that the reduction is as follows:

| Thickness of lead in inches | Reduction in Intensity as fraction of original | Actual Intensity |
| --- | --- | --- |
| 0 | 1 | 934 |
| ½ | ½ | 467 |
| 1 | ¼ | 234 |
| 1½ | ⅛ | 117 |
| 2 | 1/16 | 59 |
| 2½ | 1/32 | 30 |
| 3 | 1/64 | 15 |
| 3½ | 1/128 | 7.5 |
| 4 | 1/256 | 3.8 |
| 4½ | 1/512 | 1.9 |
| 5 | 1/1024 | 1.0 |
| 5½ | 1/2048 | .5 |
| 6 | 1/4096 | .25 |

In the apparatus herein set forth, the intensity of radiation at the surface of the device, when the device contains a total of 500 millicuries is 4.5 mr.h., an order of intensity which permits an operating technician to be in actual contact with the device for a period of eight hours a day, and still receive total radiation of the order of one-half the allowable limit.

For larger or smaller total radiations emitted by all of the sources, the dimensions can be correspondingly increased and decreased to maintain the same order of radiation protection. For example, a total of 1000 millicuries would require an additional one-half inch of lead in every direction to obtain the same conditions that have been described in the preceding paragraph. For individual sources greater than 25 millicuries an additional half-inch of lead is required when the content of the individual source is doubled.

The immediate availability of an individual source is of paramount importance. In the device described the individual source may be removed and discharged into a protective cylinder for processing, in less than five seconds, thereby reducing the exposure to unshielded radiation from the individual source to a negligible amount. The operation can be performed at arms length or a distance from the body of approximately one meter, at which distance the intensity of radiation from an unshielded 25 millicurie source is 21 mr.h. so that the technician would be exposed over a period of five seconds to an amount of radiation of $\frac{1}{720}$ of 21 mr.h., or 0.03 mr., a very negligible amount of radiation.

The device of the invention may be varied to accommodate special conditions as for example, if the device of the invention is to be installed in a basement, the device of the invention may be placed on the floor and the lower half of the cast block 10 may be eliminated since downward radiation would go into the ground. Also, protective lead shielding may be added or removed from any part of the device to meet specific requirements for safety.

In the form of the invention heretofore described, the rods have been arranged vertically. It is also within the broad scope of the present invention to arrange the rods horizontally within the radiation absorbing mass. It is then necessary to have guide plates for every horizontal row of square cross section rods. These guide plates are made of lead and are secured to the sides of the recess by slots made in the sides of the recess.

Figure 7:
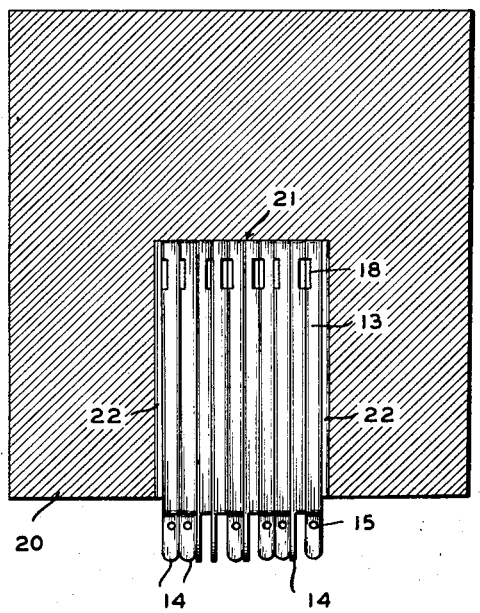
Fig. 7 is a horizontal sectional view taken on line 7—7 of Fig. 6.
Figure 9:
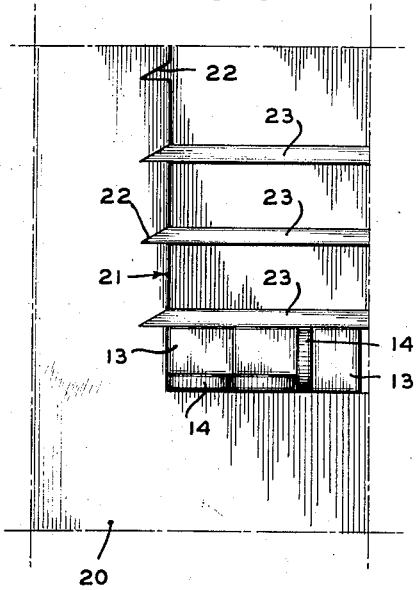
Fig. 9 is a fragmentary view on an enlarged scale illustrating the spaced method of supporting horizontally disposed rows of individual radiation sources.

Referring to Figs. 6 through 9 inclusive, a radiation absorbing mass 20, preferably in the form of a block, is provided with a recess 21, said mass being preferably composed of a plurality of lead sheets. The opposing interior walls of the recess 21 are provided with slots 22 in which are slidably disposed lead guide plates 23 which function to divide the recess 21 into a series of compartments, the latter being desirably, but not necessarily, of rectangular cross section. Each compartment is filled with rods which slidably fit side by side, each rod being provided with a tab 14 having an aperture 15. The tabs on the rods 13 protrude from the recess as shown in Fig. 7.

Each individual source of gamma radiation is identified by a number or mark which can be read by looking downwardly on the device. The operation of this device or apparatus is similar to that of the device described in Figs. 1 to 5 inclusive with the exception that the rods 13 are disposed horizontally and are, therefore, drawn out instead of being pulled up and out.

In the form of the invention shown in Figs. 6 to 9 there has been provided a radiation absorbing device comprising absorbing mass having means for dividing said mass into a series of compartments. Support means are provided for said dividing means and elongated means for shielding and storing a single radiation source is disposed in said compartments, each of said elongated means protruding beyond an exterior face of said radiation absorbing mass and being provided at one end thereof with a radiation source storage compartment, there being a protective radiation absorbing material extending unidirectionally thereover, said storage compartment being provided with means for discharging said single source of radiation therefrom.

It has been previously set forth that if circular rods are used, the solid block of radiation absorbing material may be drilled to form contiguous holes in each of which a rod fits slidably. The apertures which may be drilled in the block of lead or other radiation absorbing mass may be spaced from each other so that each rod or holder is separated from an adjoining rod or holder by a mass of lead to provide with the rod or holder the desirable amount of radiation absorbing mass.

In this form of the invention, when the rods are assembled there is a space between the individual rods or holders and this space is filled with a radiation absorbing material.

We claim:

1. A radiation source storage device comprising a radiation absorbing container having a top portion, said container surrounding a plurality of relatively elongated shielding and storing means, each thereof being adapted to contain a radiation source, each of said means extending above the top of said container and being provided at one end thereof with a radiation source storage compartment, a protective radiation absorbing material extending unidirectionally over said compartment, the latter being provided with means for discharging the radiation source.

2. A radiation source storage device comprising a radiation absorbing container having a top portion, said container surrounding a plurality of relatively elongated shielding and storing means, each thereof being adapted to contain a radiation source, each of said means extending above the top of said container and being provided at one end thereof with a radiation source storage compartment, a protective radiation absorbing material extending unidirectionally over said compartment, the latter being provided with a longitudinal discharging slot spaced from the end of said elongated means which is furthest removed from the radiation absorbing material thereof.

3. A radiation source storage device comprising a radiation absorbing container surrounding a plurality of elongated rods, each thereof being adapted to contain a radiation source, each of said rods being provided at one end thereof with a radiation source storage compartment, there being a protective radiation absorbing material extending longitudinally from said storage compartment, the latter being provided with a longitudinal discharging slot spaced from the end of said elongated means which is furthest removed from the radiation absorbing material thereof.

4. A radiation source storage device comprising a radiation absorbing container surrounding a plurality of elongated sided rods, the latter being slidably and contiguously disposed in said radiation absorbing container, each of said rods being provided at one end thereof with a radiation source storage compartment, there being a protective radiation absorbing material extending longitudinally therein, said storage compartment being provided with means for discharging a source of radiation therefrom, said means extending across the juncture of two of the longitudinally extending sides thereof.

5. A radiation source storage device comprising a sided tube adapted to contain a radiation source, the major portion of said tube being filled with protective radiation absorbing material and the minor portion of said tube being hollow, closure means for the hollow end of said tube, the sides of the hollow portion of said tube forming a storage compartment positioned adjacent said protective radiation absorbing filling material, said storage compartment having a longitudinal discharging slot extending across the juncture of two of the longitudinally extending sides of said tube.

6. A radiation source storage device comprising a radiation absorbing medium surrounding a plurality of tubes for shielding and storing a source of radiation, each tube being adapted to contain a radiation source, said tubes being slidably and contiguously disposed in said radiation absorbing medium to reduce the radiation from said source of radiation, the major portion of each of said tubes being filled with a protective radiation absorbing material, each of said tubes being provided with a radiation source storage compartment, said storage compartment being provided with means for discharging the source of radiation therefrom.

7. A radiation protective and radiation source storage device comprising a mass of radiation absorbing material formed with a recess therein, a plurality of relatively elongated shielding and storing holders, each thereof being adapted to contain a radiation source, said holders being fitted within said recess and substantially filling the same, each of said holders protruding outwardly and beyond an exterior face of said mass of radiation absorbing material, one portion of each of said holders comprising a solid mass of protective radiation absorbing material, the other portion of each of said holders having a storage compartment for the reception of said radiation source, said storage compartment being provided with means for discharging the source of radiation therefrom.

8. A radiation protection and radiation source storage device comprising a mass of radiation absorbing material formed with a recess therein, a plurality of relatively elongated shielding and storing holders, each thereof being adapted to contain a radiation source, said holders being fitted within said recess and substantially filling the same, each of said holders protruding outwardly and beyond an exterior face of said mass of radiation absorbing material, one portion of each of said holders comprising a solid mass of protective radiation absorbing material, the other portion of each of said holders having a storage compartment for the reception of said radiation source, said storage compartment being provided with a slot one end of which is positioned adjacent said solid mass of radiation absorbing material, the other end of the slot being spaced from the bottom of the storage compartment by a distance greater than one-half the length of the source of radiation.

9. A radiation source storage device comprising a radiation absorbing mass, means for dividing said mass into a series of compartments, support means for said dividing means, shielding and storing elongated holder means, each thereof being adapted to contain a radiation source disposed in each of said compartments, said holder means being slidably and contiguously disposed therein to reduce radiation from the source stored in each of said compartments, each of said elongated means protruding beyond an exterior face of said mass and being provided at one end thereof with a radiation source storage compartment, said means having a protective radiation absorbing material extending unidirectionally therein, said storage compartment being provided with means for discharging said single source of radiation therefrom.

10. A radiation source storage device comprising a radiation absorbing mass having opposing exterior walls, slots in each of said opposing walls, a series of guide plates mounted in opposing slots and dividing said mass into a series of compartments, shielding and storing elongated holder means, each thereof being adapted to contain a radiation source disposed in each of said compartments, each of said holder means protruding beyond an exterior face of said mass and being provided at one end thereof with a radiation source storage compartment, said holder means having a protective radiation absorbing material extending unidirectionaly therein, said storage compartment being provided with means for discharging said single source of radiation therefrom.

11. A radiation protection and radiation source storage device comprising a mass of radiation absorbing material formed with a recess therein, a plurality of relatively elongated holders for shielding and storing a radiation source, said holders having a storage compartment end and an end remote therefrom, the holders being slidably and contiguously disposed in said recess to reduce radiation from said holders, each of said holders protruding outwardly and beyond an exterior face of said radiation absorbing mass and being provided at one end thereof with a radiation source storage compartment having means for discharging said source of radiation therefrom, said holders having a protective radiation absorbing material longitudinally extending from said storage compartment end toward the remote end of said holder, said material filling a major portion of the holder beyond the storage compartment.

12. A radiation protection and radiation source storage device as recited in claim 11 in which each of the holders is provided with removal means.

13. A radiation protection and radiation source storage device as recited in claim 11 in which each of the holders is provided with removal means carrying identifying indicia.

14. The radiation protection and source storage device defined in claim 11 in which the holder is a sided holder and the discharge means is constituted by a longitudinal discharge slot extending across the juncture of two of the longitudinally extending sides of said holder.

15. The radiation protection and source storage device defined in claim 11 in which the storage compartment is provided with a bottom member and the means for discharging said source of radiation therefrom is spaced from the bottom of the storage compartment by a distance greater than one-half the length of the source of radiation.

16. The radiation protection and source storage device defined in claim 11 in which the storage compartment is provided with a bottom member, the holder is a sided holder, and the discharge means is constituted by a longitudinal discharge slot extending across the juncture of two of the longitudinally extending sides of said holder, said slot being spaced from the bottom of the storage compartment by a distance greater than one-half the length of the source of radiation.

17. A radiation source storage device comprising an elongated holder, the major portion of said holder being filled with protective radiation absorbing material and the minor portion of said holder being hollow, closure means for the hollow portion of said holder, said hollow portion being provided with a storage compartment positioned adjacent said protective radiation absorbing filling material, said storage compartment being provided with discharging means, the longitudinal extent of said discharging means being greater than one-half the length of the radiation source.

18. A radiation protection and radiation source storage device comprising a mass of radiation absorbing material formed with a plurality of holder recesses spaced from each other, a plurality of relatively elongated holders for shielding and storing a radiation source, said holders being respectively slidably disposed in said recesses, each of said holders protruding outwardly and beyond the exterior surface of said radiation absorbing mass, each of said holders having a protective radiation absorbing material extending longitudinally therein, said elongated holders assembled in said recesses reducing radiation from said holders, each of the latter being provided at one end thereof with a radiation source storage compartment having means for discharging said source of radiation therefrom, the major portion of said holder beyond said compartment being filled with a radiation absorbing material.

References Cited in the file of this patent

UNITED STATES PATENTS

| | | |
|---|---|---|
| 1,406,509 | Viol | Feb. 14, 1922 |
| 2,269,458 | Kahn | Jan. 13, 1942 |
| 2,285,440 | Kaiser | June 9, 1942 |
| 2,514,909 | Strickland | July 11, 1950 |
| 2,711,485 | Pennock et al. | June 21, 1955 |

OTHER REFERENCES

Radioisotopes in Industry, text edited by John R. Bradford, 1953, pages 144–147.